(12) United States Patent
Bussemaker

(10) Patent No.: US 9,499,240 B2
(45) Date of Patent: Nov. 22, 2016

(54) FLOATING MARINE STRUCTURE

(75) Inventor: Herm Berend Bussemaker, Purmerend (NL)

(73) Assignee: COBUS BEHEER B.V., Purmerend (NL)

( * ) Notice: Subject to any disclaimer, the term of this patent is extended or adjusted under 35 U.S.C. 154(b) by 150 days.

(21) Appl. No.: 13/989,622

(22) PCT Filed: Nov. 25, 2011

(86) PCT No.: PCT/NL2011/050803
§ 371 (c)(1),
(2), (4) Date: Jul. 23, 2013

(87) PCT Pub. No.: WO2012/070941
PCT Pub. Date: May 31, 2012

(65) Prior Publication Data
US 2013/0298815 A1 Nov. 14, 2013

(30) Foreign Application Priority Data
Nov. 25, 2010 (NL) .................................... 2005755

(51) Int. Cl.
*B63B 35/44* (2006.01)
*E02B 17/02* (2006.01)
*E02B 17/00* (2006.01)

(52) U.S. Cl.
CPC ............ *B63B 35/44* (2013.01); *E02B 17/021* (2013.01); *B63B 2035/446* (2013.01); *E02B 2017/0039* (2013.01); *E02B 2017/0065* (2013.01); *E02B 2017/0078* (2013.01); *E02B 2017/0086* (2013.01); *E02B 2017/0091* (2013.01)

(58) Field of Classification Search
CPC .............. B63B 35/44; B63B 35/4406; B63B 35/4413; B63B 35/442; E02B 17/0056; E02B 17/021
USPC ............... 114/264, 265, 266, 121, 123, 125; 405/203, 204, 205, 206, 207, 208
See application file for complete search history.

(56) References Cited

U.S. PATENT DOCUMENTS 2,953,904 A 9/1960 Christenson
3,001,370 A * 9/1961 Templeton .................... 405/200

(Continued)

FOREIGN PATENT DOCUMENTS

DE 2457536 A1 6/1976
WO WO 99/51821 A1 10/1999
WO WO 2010/085970 A1 8/2010

*Primary Examiner* — Andrew Polay
(74) *Attorney, Agent, or Firm* — Birch, Stewart, Kolasch & Birch, LLP

(57) ABSTRACT

The invention provides a sub-structure (2) comprising at least one leg (4) having first buoyancy means (4a) arranged in a lower part of the at least one leg to provide a first buoyancy, and a float element (3) having second buoyancy means to provide a second buoyancy, wherein the sub-structure and the float element are constructed to allow relative wave induced motion with respect to each other in a substantially vertical direction wherein the leg is movable from a pre-installation position to an installation position by a substantially downwards movement of the leg with respect to the float element, and wherein during at least a second part of the downwards movement of the leg towards the installation position and/or in the installation position the first buoyancy means are substantially located below a wave zone to substantially decrease heave action on the first buoyancy means.

14 Claims, 6 Drawing Sheets

(56) References Cited

U.S. PATENT DOCUMENTS

| | | | |
|---|---|---|---|
| 3,118,283 A | | 1/1964 | True et al. |
| 3,474,749 A | * | 10/1969 | Williamson ............ B63B 21/50 |
| | | | 114/230.1 |
| 3,996,754 A | * | 12/1976 | Lowery ........................ 405/197 |
| 4,451,174 A | | 5/1984 | Wetmore |
| 4,627,767 A | | 12/1986 | Field et al. |
| 5,833,396 A | * | 11/1998 | Thomas ........................ 405/198 |
| 6,196,767 B1 | * | 3/2001 | Thomas ........................ 405/203 |

* cited by examiner

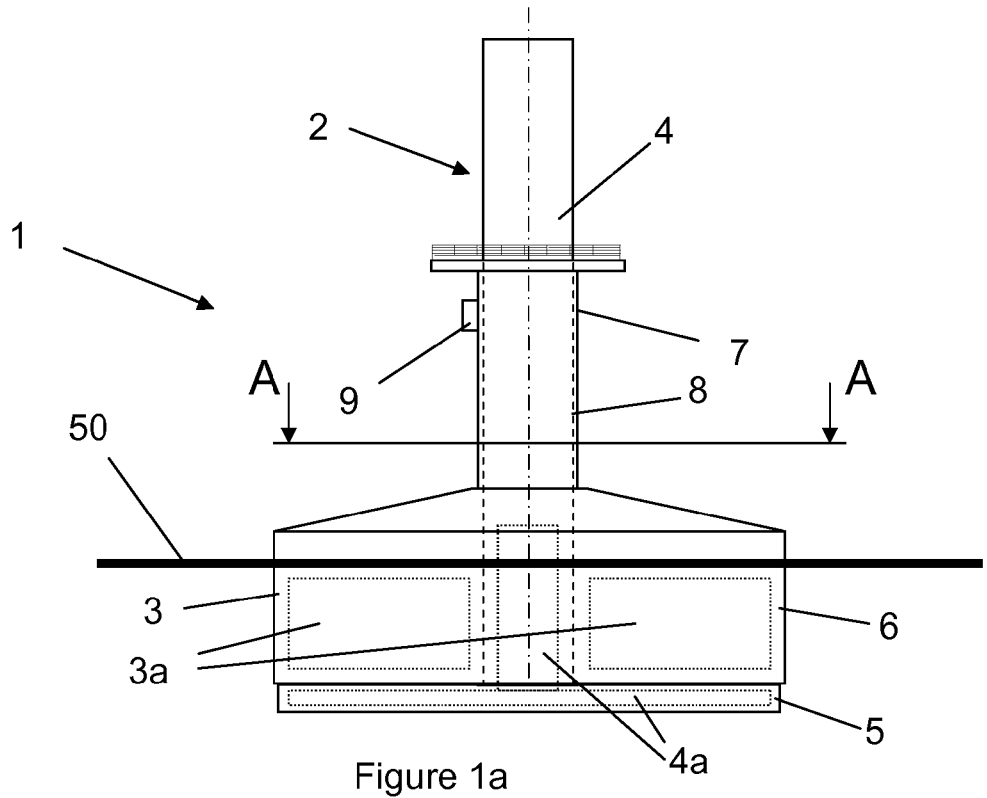
Figure 1a
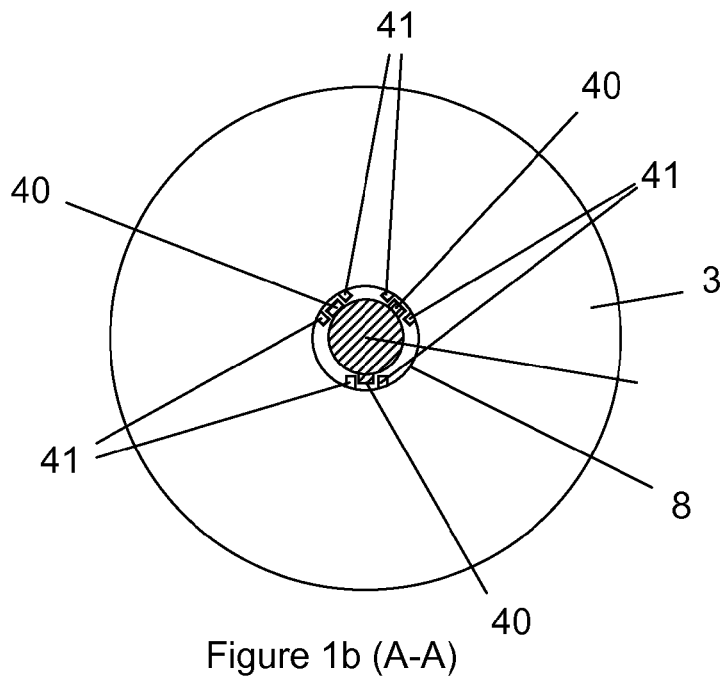
Figure 1b (A-A)

FLOATING MARINE STRUCTURE

The present invention relates to a floating marine structure, for example an off-shore wind turbine including a base. The invention also relates to a method to install a marine structure.

WO 99/51821 discloses a floating marine structure comprising suction piles. The marine structure comprises a buoyancy which is sufficient to transport the marine structure over water in a substantially upright position. The buoyancy is concentrated near the suction piles, in particular in line with the suction piles.

DE 24 57 536 discloses a marine structure with a floating base, a separate floater and a work deck where the base and floater are lowered to the sea bottom to form a foundation using a winch or crane system.

Another offshore platform is known from U.S. Pat. No. 4,451,174. The platform comprises a gravity-type foot structure having a plurality of watertight compartments which are controllably ballastable with sea water between an unballasted buoyant state which allows floating of the platform during transit and a ballasted state while stationary at the use site. The foot structure rigidly supports a single central column extending through a central opening of a deck which is movably supported on the column. The deck carries a plurality of jack-up legs to move the deck relative to the foot structure along the column. During transit of this mobile offshore platform, the deck is lowered to a position adjacent to the foot structure with the platform floating on the foot structure alone. During installation of the platform the buoyancy of the deck will be used to provide stability and buoyancy. The base is lowered or pushed down to the sea bottom using a winch or crane system to form the foundation.

U.S. Pat. No. 4,627,767 discloses a marine structure with a base, a separate floater and a deck structure where the base is ballasted down to the sea bottom and where the separate floater is used to provide stability during lowering and being connected to the base and deck using a winch or crane system to form jacking legs.

WO2010/085970 discloses a marine structure with a base, a separate floater and a deck structure where the base is ballasted down to the sea bottom and where the separate floater is used to provide stability during lowering and being connected to the base and deck using a winch or crane system to form jacking legs.

A drawback of the known marine structures is that the different buoyancy elements to provide buoyancy and stability during lowering are connected or need to be connected in vertical sense with a lifting or jacking system. The effect of this connection will be that all elements will show the same wave induced heave motions which reduce the capability to withstand wave-induced forces and motions during installation. Also the system will introduce large dynamic loads due to wave actions and requires additional costs to install and procure the lift system. Another drawback of the marine structure is that the marine structure is relative unstable when sinking it to the bottom of the sea. Temporary buoyancy means, i.e. buoyancy means which are detached from the marine structure after installation may be provided to increase stability during installation of the marine structure. However, the provision of the temporarily means involves extra steps during installation of the marine structure.

It is an aim of the present invention to provide an alternative floating marine structure which is relative stable during installation of the marine structure, and/or with an improved capability to withstand wave-induced forces and motions during installation, or at least to provide an alternative marine structure.

The present invention provides a floating marine structure comprising:
a marine sub-structure comprising at least one leg with first buoyancy means arranged in a lower part of the at least one leg to provide a first buoyancy, and
a float element with second buoyancy means to provide a second buoyancy, wherein the sub-structure and the float element are constructed to allow relative wave induced motion with respect to each other in a substantially vertical direction, wherein the leg is movable from a pre-installation position to an installation position by a substantially downwards movement of the leg with respect to the float element, and wherein during at least a second part of the downwards movement of the leg towards the installation position and/or in the installation position the first buoyancy means are substantially located below a wave zone to substantially decrease heave action on the first buoyancy means.

For any marine structure the buoyancy in the system will work to carry the weight of the platform and to provide stability against heeling or toppling of the structure. The marine structure of the invention uses two separate buoyancy elements. Each of these two separate buoyancy elements provides one of the functions of buoyancy.

The installation process of the marine structure on the bottom of the sea may comprise two steps, being:
Step 1) Lowering of the marine sub-structure comprising at least one leg with a first buoyancy,
Step 2) Lowering of the float element with a second buoyancy.

During step 1 of the installation, the first buoyancy means carries the weight of the payload, and the second buoyancy means provides the stability against heeling.

During step 2 of the installation, the first buoyancy means is ballasted and firmly placed on the bottom of the sea. This first buoyancy means will now be used to provide the stability against heeling to the second buoyancy means.

During the first step the second buoyancy means will remain in the waterplane to provide the stability against heeling while this second buoyancy will be affected by the heave action of the waves. Since the first buoyancy means that carries the payload is arranged in a lower part of the leg, the first buoyancy means can be arranged, below the wave zone and because there is no vertical connection between the first and second buoyancy substantially no wave heave will be noticeable on the first buoyancy means. Thus, the heave action on the sub-structure is substantially decreased, for example minimised, when compared to a first buoyancy means arranged in the wave zone and/or when there is a connection in vertical direction between the leg and the float element. This behaviour will allow the structure to be placed on the seabed without large vertical bottom contact or impact loads.

In this application the first buoyancy means arranged in a lower part of the leg means that at least during a part of the installation and/or after installation of the marine structure, the first buoyancy means will be arranged below the wave zone. As a result of this position of the first buoyancy means below the wave zone, and since the leg and float element are constructed to allow relative wave induced motion with respect to each other, there is no or little heave action on the marine sub-structure.

The wave zone is a zone directly below the water surface where there is substantial wave action.

After the leg has been placed on the bottom, the float element can be lowered down as step 2 of the installation process. In this step the float element will be lowered down through the water column. When the float element submerges under the waterline, this float element will lose the stability against heeling property of the buoyancy. The leg, which is placed on the bottom of the sea, will provide the necessary stability against heeling to the float element during the lowering process. The lowering of the float element can be done by only ballasting or by also using a control system e.g. winches, cranes, jacking system or brake system. The control system will be between the first buoyancy structure which is firmly on the bottom of the sea and the float element. Using this control system will not have any significant effect on the capability to withstand wave-induced forces and motions during installation.

The invention was above explained with respect to a marine structure to be arranged on the bottom of the sea. The split of buoyancy in a stabilizing part and a load carrying part has many other useful applications. For instance, the relative motion between the two buoyancy elements can be converted to useable energy.

US 2010/0041289 A1 discloses a marine structure with the intention to generate energy from the relative motions of two floating bodies. This invention comprises a spar with an anchoring system and a float element that can move in axial direction relative to the spar. In vertical sense the spar element is effectively connected to the seabed with the anchor system. The float element will be situated in the wave zone and will heave relative to the spar element.

A drawback of this system is the anchoring system which forms part of the invention. It is known form experience that a vertical loaded anchoring system will be sensitive to wave actions wear and tear and as a consequence be expensive.

The present invention does not include an anchoring system to generate the relative heave motion between the two bodies. The required effect, being a relative heave motion between two bodies, has been achieved by concentrating the buoyancy of the leg in a lower part of the leg so that it can be placed below the wave zone. This will generate a "semi submergible" effect which will reduce the heave motion of the first buoyancy means while the second buoyancy means will show normal heave motions. This system will also need an anchoring system, but the only intention of the anchoring will be to control the horizontal position of the structure.

The present invention can also be used as a floating platform for those applications were it is important to have very little heave motions of the payload. In such embodiment, the first buoyancy means can be arranged at a relative deep position, i.e. below the wave zone, to minimise wave heave action. The second buoyancy means in the float element provide stability to the floating marine structure.

The provision of the float element which is in a substantially vertical direction movable with respect to the sub-structure provides a marine structure which can be used for different applications. The relative vertical movement of the sub-structure and the float element may be limited between two relative positions. The marine structure may comprise a linear guiding device to guide linear movement of the float element with respect to the sub-structure in the substantially vertical direction.

The substantially vertical direction of the movement between sub-structure and float element is related to an upright orientation of the marine structure, for instance when the marine structure floats on a horizontal sea surface.

The marine structure is self-floating, i.e. the buoyancy of the marine structure is sufficient to keep the marine structure afloat. The term floating relates to the capacity of the marine structure to float before installation. After installation, the marine structure may no longer float, and even be installed on the basis of the weight of the marine structure itself.

The marine structure may also be self-installing, i.e. no separate lifting equipment is required to install the marine structure at a desired installation location.

The float element may be non-removably arranged in the marine structure, i.e. the float element is a permanent part of the marine structure. In this application the term permanent part is used to indicate that the float element is not removed after installation of the marine structure. Thus, the float element is not temporarily provided in or at the marine structure to provide temporary buoyancy during transport and/or installation. After installation the float element is still present although it may have another function. It may for instance be ballasted and become a ballast element of the base of the installed marine structure.

At least the bottom part of the float element may be cylindrical with a relative large diameter. In an embodiment, the diameter may be larger than the height of the float element. The float element may also have any other suitable shape.

The leg may be any structural element such as column, pillar or pile allowing a vertical movement of the float element with respect to the leg. The leg of the sub-structure may comprise a foot, the foot preferably having a substantially disk like shape. The radius of a disk like shaped foot may be substantially the same as the radius of the float element.

The combination of sub-structure and float element provides a marine structure which can be used in many different applications. The floating marine structure may for instance be used as an offshore platform, a work platform, a turbine, a meteo mast, or a wave energy converter. A utility element such as an offshore platform, a work platform, a turbine, a meteo mast, or a wave energy may be arranged on the float element and/or on the sub-structure.

In principle, the marine structure according to the invention allows two installation positions. A first installation position wherein the marine structure is supported on the bottom of the sea, and a second installation position wherein the marine structure keeps floating in the sea at an installation location.

In the first installation position, the leg is lowered during installation so that a bottom end of the leg, for instance a foot of the leg, comes to rest on the bottom of the sea. The float element may provide horizontal stability to the leg during lowering of the leg. The leg may for instance be lowered by ballasting the leg, therewith decreasing the buoyancy of the leg. As an alternative or in addition thereto, the leg may be lowered by a lifting device between the float element and the sub-structure.

After the leg is arranged on the bottom of the sea, the float element may be ballasted so that is also sinks into the sea. In an embodiment, the float element may come to rest on the leg, for instance the foot, or directly on the bottom of the sea. This position of the float element may further improve stability of the installed marine structure. During lowering of the float element the leg supported by the bottom of the sea may provide stability to the float element. Thus, in this first installation position the float element is also a ballast element which, after installation, forms part of the underwater base of the installed marine construction.

Due to this subsequent lowering of the leg and the float element, the provision of buoyancy bodies over a large vertical distance to increase stability during lowering of the marine structure may be avoided, since the float element provides stability during lowering of the leg and the leg provides stability during the lowering of the float element.

In the second installation position, the marine structure keeps floating at the installation location. In this second installation position, the float element is preferably kept at sea level, while the bottom end of the leg is brought into a semi-submerged position, where it may be less influenced by heave of the sea.

In an embodiment, the sub-structure and the float element are freely movable with respect to each other in the substantially vertical direction. In such embodiment, the first buoyancy is sufficient to keep the sub-structure afloat, and the second buoyancy is sufficient to keep the float element afloat.

This embodiment can for instance be useful for the second installation position, wherein the marine structure floats in the sea. When the leg is brought to a semi-submerged position it is less influenced by heaving. At the same time the float element provides stability to the marine structure. However, any vertical movement of the float element due to heave is not transferred to the sub-structure, since the float element can freely move in this vertical direction with respect to the sub-structure. Also to install the marine structure in the first installation position such embodiment may be advantageous since no lifting devices have to be arranged to install the marine structure at the bottom of the sea.

In an embodiment, the float element encloses the at least one leg in a substantially horizontal plane. By enclosing the leg in a substantially horizontal plane, movements of the leg with respect to the float element in this horizontal plane may be avoided. As a result the marine structure only allows movements of the float element and the sub-structure with respect to each other in the substantially vertical direction.

The enclosure may for instance be formed by a substantially vertically orientated passage extending through the float element. Preferably, the passage is arranged on a central axis of the float element, for instance a vertical axis of rotation symmetry of the float element.

The enclosure formed by the float element forms a linear guiding device to guide the substantially vertical movement of the leg and float element with respect to each other.

In an embodiment, the marine structure comprises a braking device to provide braking force between the sub-structure and the float element. In an embodiment, wherein the float element can freely move in the vertical direction with respect to the sub-structure, it may sometimes be desirable or even required to stop or restrict this free movement, for instance during transport of the marine structure towards the installation location, or during lowering of the leg with respect to the float element or vice versa. In such case, the braking device can be provided to control the relative movement of the leg and the float element.

In an embodiment, the marine structure comprises one or more lifting devices to move or control movement of the sub-structure and the float element with respect to each other. In some embodiments, it may be desirable that the relative movement of the leg and the float element can be accurately controlled and/or that the weight of the leg/sub-structure is partly carried by the sub-structure/leg. The provision of one or more lifting devices may be useful to make this movement possible.

Since the combination of sub-structure and float element can move in vertical direction with respect to each other, a single leg in combination with a float element enclosing the leg provides a relative simple construction with high stability. Therefore, the marine structure preferably comprises a single leg enclosed by a float element, wherein the enclosure of the float element only allows movement of the float element with respect to the leg in a single direction, i.e. the vertical direction.

In another embodiment, the marine structure comprises multiple legs and one or more float elements, each leg being enclosed by one of the one or more float elements. For some applications it may be desirable that multiple legs are provided to increase stability of the marine structure. In such embodiment, all legs may be enclosed by one or more float elements to create the possibility of linear movement between the legs and the one or more float elements.

In an embodiment, the sub-structure comprises a platform movable with respect to the leg in the substantially vertical direction.

The invention also relates to a method to install a marine structure, comprising the steps of:
providing a marine structure, comprising:
 a sub-structure comprising at least one leg having first buoyancy means arranged in a lower part of the at least one leg to provide a first buoyancy, and
 a float element having second buoyancy means to provide a second buoyancy,
 wherein the sub-structure and the float element are constructed to allow relative wave induced motion with respect to each other in a substantially vertical direction,
sailing the marine structure to an installation location, and moving the leg downwards with respect to the float element to an installation position of the leg, wherein during at least a second part of the downwards movement of the leg towards the installation and/or in the installation position the first buoyancy means are substantially located below a wave zone to substantially decrease heave action on the first buoyancy means.

In an embodiment, the first buoyancy means is ballastable to decrease buoyancy of the leg and the step of moving the leg downwards comprises ballasting the leg.

In an embodiment, the leg comprises a foot to be arranged on the bottom of the sea, and the step of moving the leg to the installation position comprises arranging the foot of the leg on the bottom of the sea.

In an embodiment, the second buoyancy means is ballastable to decrease buoyancy of the float element and comprising, after the foot of the leg is arranged on the bottom of the sea, the step of moving the float element downwards with respect to the leg to a float element installation position by ballasting of the float element.

In an embodiment, the float element in its float element installation position rests on the foot of the leg.

The invention will now further be explained with respect to a number of embodiments, whereby reference is made to the appended drawings, in which:

FIG. 1a shows a first embodiment of a marine structure according to the invention;

FIG. 1b shows a top view on the cross section along the line A-A in FIG. 1a;

Figures 2A, 2B, 2C:
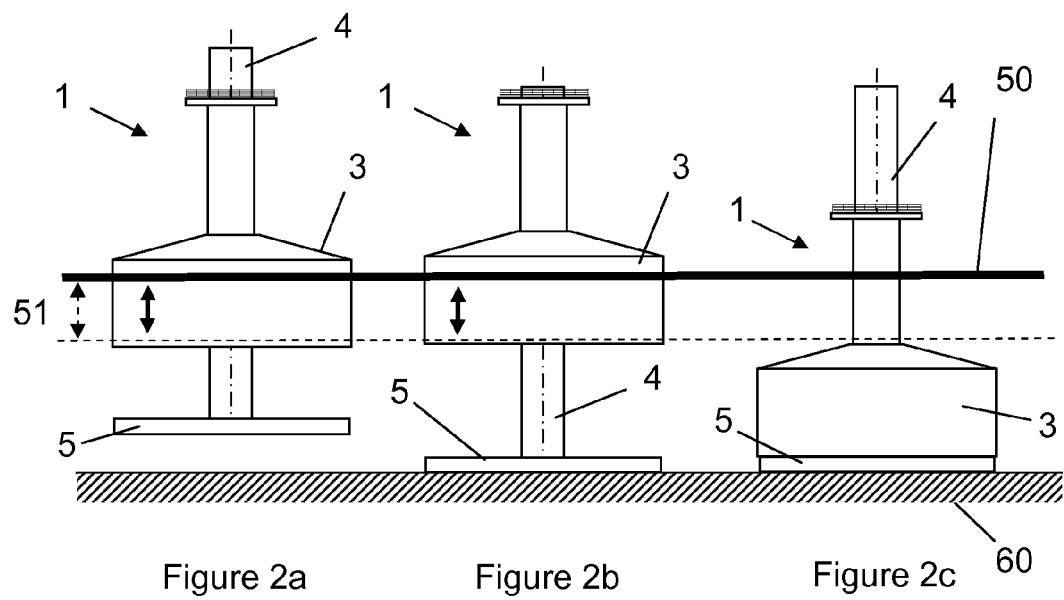
Figures 3A, 3B, 3C:
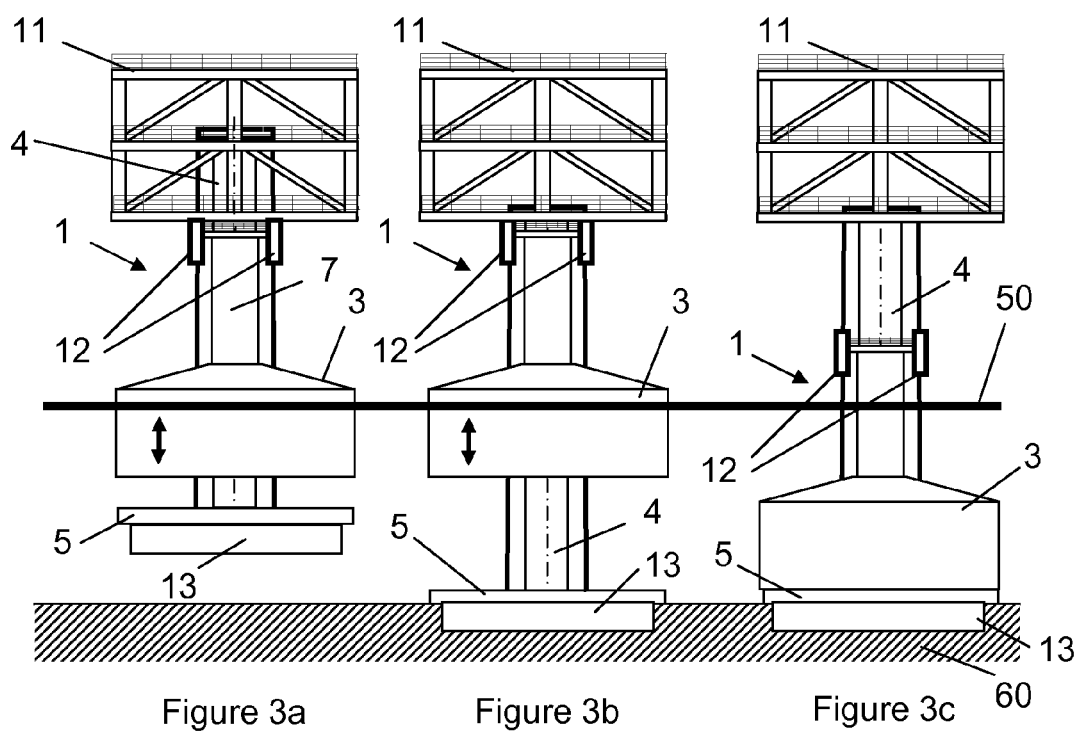
Figures 4A, 4B, 4C:
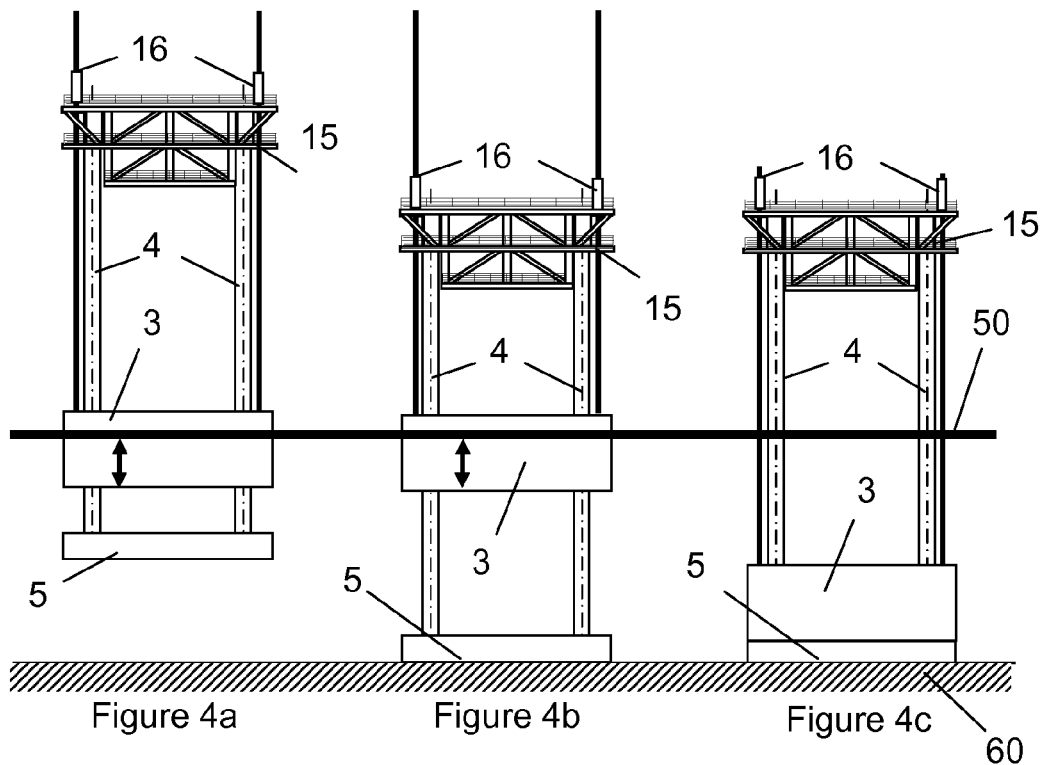
Figures 5A, 5B, 5C:
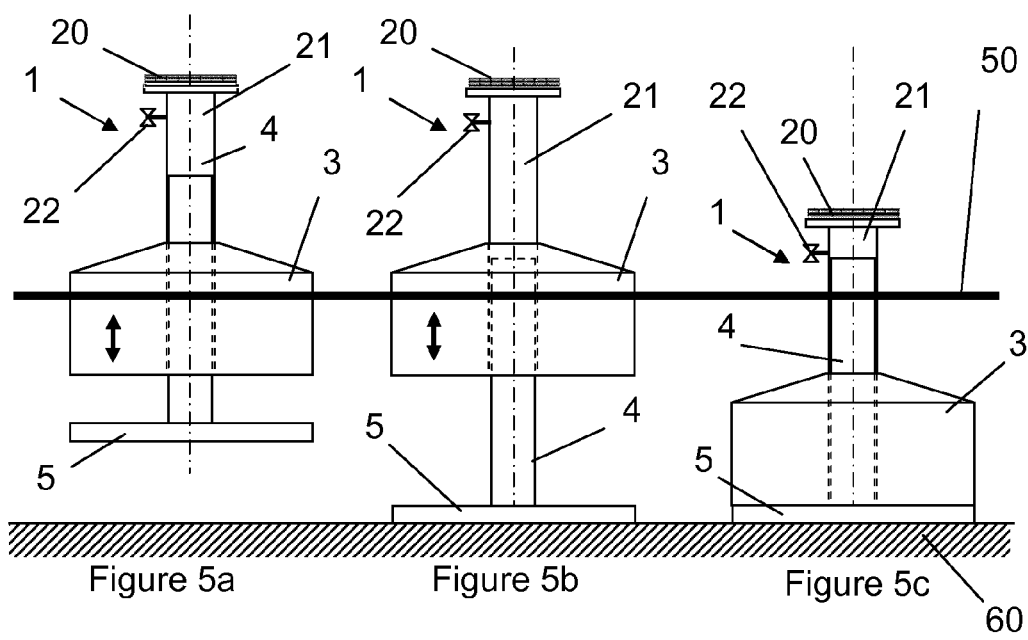
Figure 6:
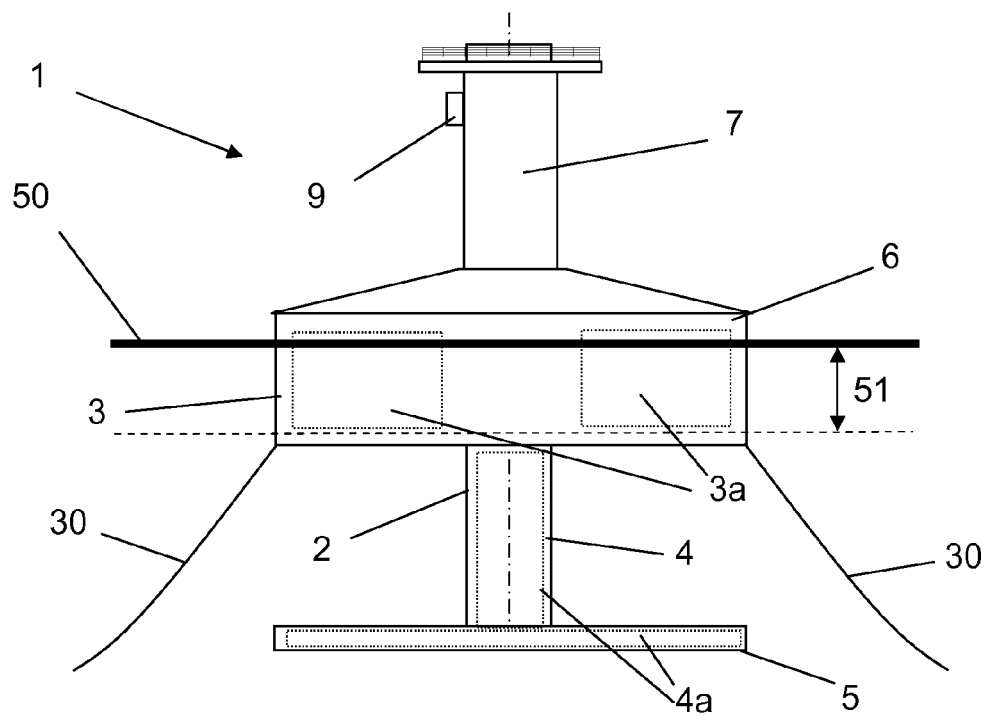
Figure 7:
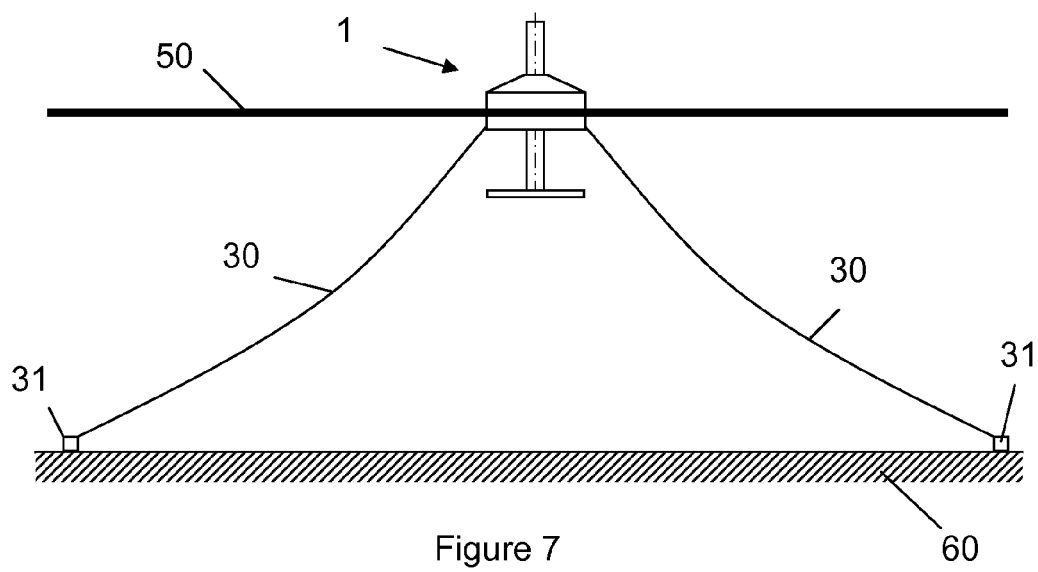

FIGS. 2a, 2b, and 2c show installation steps of the embodiment of FIG. 1a;

FIGS. 3a, 3b, and 3c show installation steps of a second embodiment of a marine structure according the invention;

FIGS. 4a, 4b, and 4c show installation steps of a third embodiment of a marine structure according the invention;

FIGS. 5a, 5b, and 5c show installation steps of a fourth embodiment of a marine structure according the invention;

FIGS. 6 and 7 show a fifth embodiment of the invention after installation; and

Figure 8:
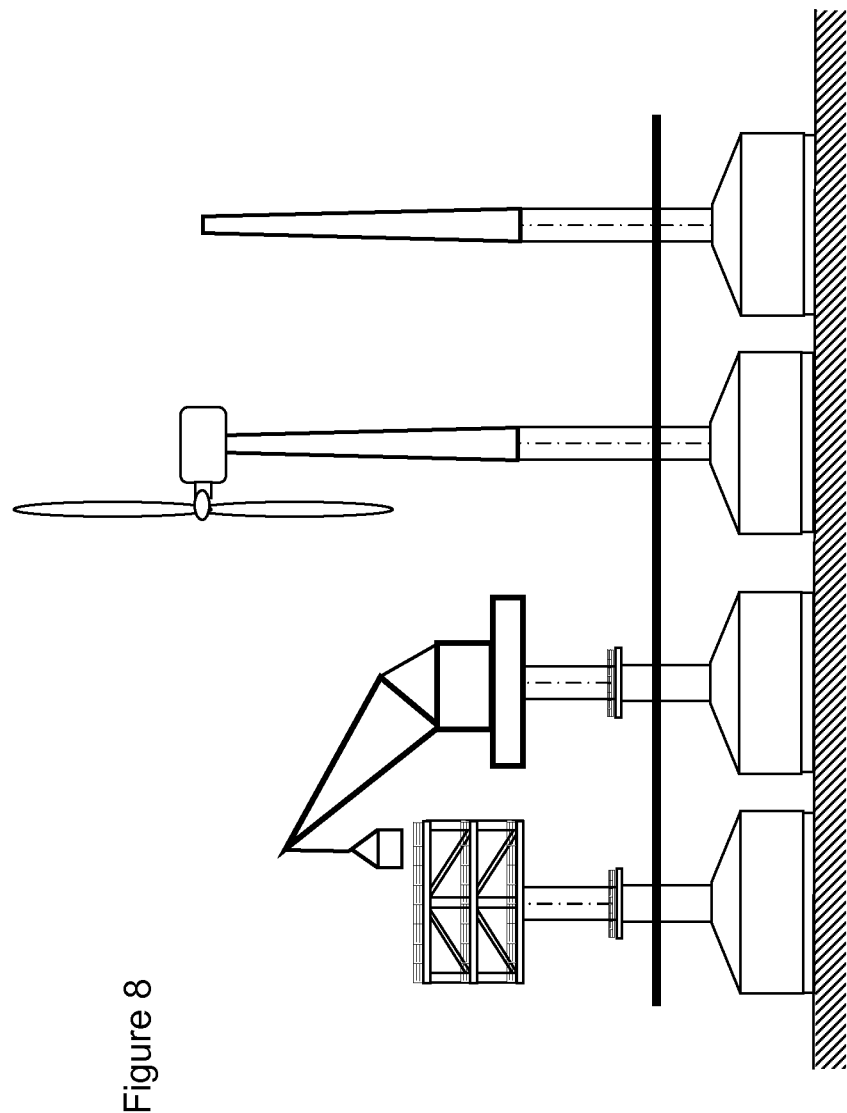
Figure 9:
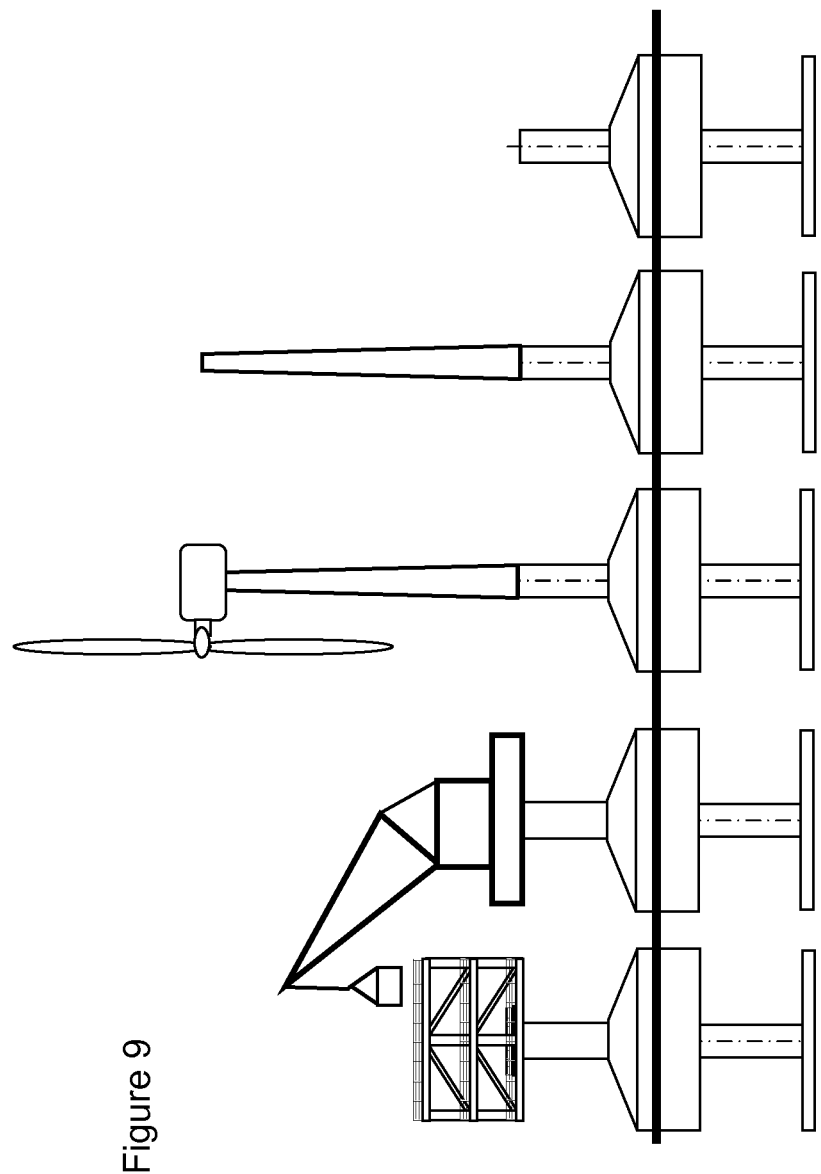

FIGS. 8 and 9 show different applications of marine structures according to the invention after installation supported on the bottom of the sea and floating in the sea, respectively.

FIG. 1a shows a first embodiment of a marine structure according to the invention, generally indicated by the reference numeral 1. The marine structure 1 comprises a sub-structure 2 and a float element 3. The sub-structure 2 comprises a leg 4 having a foot 5. The leg 4 has a first buoyancy means 4a, for instance air chambers or such, within a lower part of the leg 4 and foot 5 to provide a first buoyancy to the marine structure 1. This first buoyancy is sufficient to keep the sub-structure 2 afloat. The first buoyancy means 4a can be ballasted, for instance by introduction of water, concrete or other material, to decrease the first buoyancy to a level where the sub-structure 2 sinks in the water.

The float element 3 has a second buoyancy means 3a, for instance air chambers or such, to provide a second buoyancy to the float element 3. The second buoyancy is sufficient to keep the float element 2 afloat. Also, the second buoyancy means 3a can be ballasted, for instance by introduction of water, concrete or other material, to decrease the second buoyancy to a level where the float element 3 sinks in the water.

Before installation the combined buoyancy of the first buoyancy and the second buoyancy is sufficient to keep the marine structure 1 floating in the sea. The sea level is for instance indicated by 50. Thus, the marine structure 1 is self-floating, i.e. no other means have to be provided to keep the marine structure 1 floating on the sea.

The float element 3 has a substantially cylindrical symmetrical shape and comprises a cylindrical bottom part 6 and a sleeve or tube shaped top part 7. The float element 3 comprises a passage 8 through which the leg 4 extends from above the float element to the foot 4. In the passage 8 the leg 4 is enclosed in the horizontal plane, so that the combination of passage 8 and the leg 4 only allows movements of the leg 4 with respect to the float element 3 in the substantially vertical direction. In alternative embodiments, the top part 7 may be omitted.

The leg 4 can freely move in a substantially vertical direction with respect to the float element 3, although in the shown embodiment downward movement of the float element 3 with respect to the leg 4 is limited by the foot 5. In all other directions movement of the float element 3 with respect to the leg 4 is constrained by the passage 8 in the float element.

A braking device 9 is provided to provide a braking force between the leg 4 and the float element 3. With this braking device 9 relative movement between leg 4 and float element 3 can be stopped or controlled more accurately. For instance, during transport of the marine structure 1 towards the installation location, it may be desirable that no movement is possible between leg 4 and float element 9. The brake device 9 may comprise a control device to control the braking force provided by the braking device 9. When desired multiple braking devices 9 may be provided, which are preferably divided over the circumference of the passage 8.

The braking device 9 may for instance comprise a number of braking members, for instance rubber pads, which can be forced against the outer surface of the leg 4 by one or more hydraulic cylinders of the braking device 9.

As an alternative for a braking device 9, or in addition thereto a locking device may be provided to lock the leg in the transportation position, as shown in FIG. 1a, or any other desirable position.

FIG. 1b shows a possible embodiment of a linear guiding arrangement to be used for the linear guiding of the float element 3 and the leg 4 with respect to each other. The leg 4 comprises three first guiding elements 40 arranged around the circumference of the leg 4. The guiding elements 40 are placed between pairs of second guiding elements 41 arranged at the inner surface of the passage 8. The combination of first and second guiding elements 40, 41 provides a relative and reliable guiding device to make linear movement of the leg 4 and the float element 3 with respect to each other in the substantially vertical direction possible.

Any other linear guiding device making such movement possible may also be applied.

FIGS. 2a, 2b and 2c show the installation of the marine structure 1 on the bottom of the sea 60. The marine structure 1 is self-installing, i.e. no separate lifting equipment is required to install the marine structure at a desired installation location.

In FIG. 2a, the marine structure 1 is shown floating on the sea, indicated by sea level 50, above an installation location during step 1 of the installation sequence. The marine structure 1 is sailed to this installation location while it was floating on its own buoyancy.

To install the marine structure 1 on the bottom of the sea 60, first the leg 4 is lowered until the foot 5 comes to rest on the bottom of the sea 60. During lowering of the foot the marine structure 1 is stabilized by the presence of the float element 3 enclosing the leg 3. The leg 4 can be lowered by ballasting the first buoyancy means 6 so that the first buoyancy becomes negative and the sub-structure 2 sinks into the sea. During a second part of the downwards movement towards the installation position and in the installation position the first buoyancy means are positioned below a wave zone 51, so that heave action on the first buoyancy means are minimized. At the same time the second buoyancy 7 of the float element 3 is remained at substantially the same level so that the float element 3 acts as a stabilizing element. On float element 3 a vertical double arrow is drawn to indicate the heave motion of float element 3 induced by wave action. On foot 5 and leg 4 no vertical arrow has been drawn to indicate that this part of the structure is not heaving induced by wave action. In FIG. 2b it is shown that the leg 4 is lowered in a position so that the foot 5 rests on the bottom of the sea. It is clear that the leg 4 has been moved through the passage 9 in a substantially vertical direction with respect to the float element 3.

After the leg 4 is arranged on the bottom of the sea 60, the second buoyancy means 3a of the float element 3 may be ballasted so that it also sinks into the sea. During this downwards movement, the float element 3 is guided by the leg 4. Since this leg 4 now rests on the bottom of the sea 60, the leg 4 provides stability to the float element 3. As a result, the float element 3 may be completely submerged during a part of the downwards movement of the float element 3, while at the same time stability of the marine structure is maintained.

When the float element 3 is completely moved downwards, it comes to rest on the foot 5. The combination of the weights of the float element 3 and the leg 4 including foot 5 and provides a stable base for the marine structure 1 even if relative large or tall objects, such as wind turbines or cranes are arranged on the marine structure 1, for instance on top of the leg 4 or on top of the top part 3.

FIG. 2c shows the marine structure in the installed position after lowering of the float element 3.

The base formed by float element 3 and leg 4 may completely be held on the ground by gravity forces acting on the base. In alternative embodiments, extra measures may be provided to anchor the base on the bottom of the sea. Also, one or more tilting devices may be provided to tilt the marine structure in an upright position, for instance when the bottom of the sea is not completely flat. As an alternative the bottom of the sea may be flattened before installation of the marine structure 1, or the foot 4 may be adapted to the bottom of the sea.

FIGS. 3a, 3b, and 3c show the installation of a second embodiment of a marine structure 1 according to the invention. The same reference numerals have been used for the same parts or parts having substantially the same function.

In the embodiment of FIGS. 3a, 3b, and 3c a work platform 11 is provided. The work platform 11 is movable with respect to the leg 4 between a pre-installation or transport position and an after-installation position.

Furthermore, lifting devices 12 are provided to move the sub-structure 2 with respect to the float element 3 or to control this movement more accurately. In this embodiment, the sub-structure 2 and the float element 3 cannot move freely with respect to each other since the lifting devices 12 are arranged between the sub-structure 2 and the float element 3 when activated. The lifting devices may for instance be strand jack systems or winches.

The lifting devices 12 are not used to exert a lifting force from top of the top part 7 of the float element to the foot 5, and to exert a lifting force from the top of the leg 4 to the top of the sleeve 7. In alternative embodiments, the lifting devices 12 or similar devices may be provided to only lift one of the leg 4 and float element 3 with respect of the other.

Further, the bottom side of the foot 5 is provided with downwardly extending skirts 13 forming a matrix of suction spaces. These suction spaces may each be connected to a vacuum system to draw air/water from these spaces. When the foot 15 is arranged on the bottom of the sea the foot can be drawn into the ground by applying a vacuum in the suction spaces. By applying different vacuum levels in different suction spaces, the orientation of the marine structure may be corrected.

FIG. 3a shows the marine structure 1 in the transportation position and the first step of the installation procedure. The bottom of the platform 11 is at substantially the same height as the top of the top part 7, and the foot 5 is arranged against the float element 3.

During installation of the marine structure 1, first the leg 4 is lowered by ballasting the first buoyancy means 4a. The lifting devices 12 will not be used to allow the vertical heave motion of the float element 3. During this lowering of the leg 4 the work platform 11 is supported on the top part 7 so that it does not move downwards with the leg 4. During a second part of the downwards movement of the leg 4 towards the installation position and in the installation position, the first buoyancy means 4a will be arranged below the wave zone such that little heave action is exerted on the leg 4. When the foot 4 comes to rest on the bottom of the sea, the skirts may be pushed partly into the soil due to the weight of the sub-structure 2. By applying a vacuum in one or more of the suction spaces formed by the skirts 13, the leg 4 may be pulled further into the ground and possibly be tilted to the desired vertical orientation.

FIG. 3b shows the marine structure 1 with the leg 4 in the installed position. Subsequently, the float element 3 may be lowered by combination of ballasting the buoyancy means 3a and/or by actuation of the lifting devices 12 to lower the float element 3 with respect to the sub-structure 2.

Before the float element 3 is lowered, the work platform 11 is connected to the leg 4 instead of the top part 7 of the float element 3. As a result, the work platform 11 will be arranged on a top part of the leg 4.

FIG. 3c shows the marine structure 1 in installed position. The float element 3 is lowered and rest on the foot 5. From comparison of FIGS. 3a and 3c it is clear that the work platform 11 is arranged at a higher level with respect to the rest of the marine structure 1 in the installed position when compared with the transportation position. The advantage of a relative low position during transport is that the marine structure 1 floating on the sea is more stable. A relative high position after installation requires a lower marine structure 1, which is advantageous in view of the costs.

Another advantage of this installation method is the low vertical motion of the foot 5 during touch down on the bottom. This feature will embody the intention of the invention to improved the capability to withstand wave-induced forces and motions during installation. On float element 3 a vertical double arrow is drawn to indicate the heave motion of float element 3 induced by wave action. On foot 5 and leg 4 no vertical arrow has been drawn to indicate that this part of the structure is not heaving induced by wave action.

FIGS. 4a, 4b and 4c show the installation of another embodiment of the marine structure 1 according to the invention. In this embodiment, four legs 4 are provided in four corner areas of the marine structure 1. All four legs 4 are enclosed by the float element 3, and connected to a common foot 5. The legs 4 and the float element 3 can only be moved in a substantially vertical direction with respect to each other.

A platform 15 is fixed to the upper part of the legs 4, and lifting devices 16 are provided to move or control movement of the float element 3 with respect to the legs 4.

During lowering of the legs 4, the foot 5 and the deck 15 the float element 3 is free to heave as indicated by the double arrow. The buoyancy means of the legs 4 are at least during a second part of the downwards movement of the leg 4 towards the installation position and in the installation position arranged below the wave zone such that little heave action is exerted on the legs 4.

FIGS. 5a, 5b and 5c show the installation of another alternative embodiment of a marine structure 1 according to the invention. In this embodiment, a platform 20 is arranged on the top part 7 of the float element 3. The platform 20, the passage 8 and the top end of the leg 4 delimit a space 21. This closed space 21 can be used for moving and/or controlling movement of the float element 3 and the leg 4 with respect to each other. A valve 22 is provided to connect a pressure and/or vacuum pump (not shown) to increase or decrease the pressure in the space 21. By increasing the pressure in the space 21 the leg 4 may be pressed downwards with respect to the float element 3. By creating a relative low pressure in the space 21 the float element 3 may be pulled downwards with respect to the leg 4.

In this way, the space 21 may be used during installation of the marine structure 1. In a pre-installation position, the leg 4 and the float element 3 are arranged in the position shown in FIG. 5a.

When the marine structure 1 is located at an installation location, the leg 4 may be lowered with respect to the float element 3 by ballasting of the leg 4. At the same time air may be pumped into the space 21 to let the leg 4 move downwards in a controlled manner.

After the foot 5 comes to rest on the bottom of the sea 60, as shown in FIG. 5b, the float element 3 may be lowered with respect to the leg 4. This movement can be created by ballasting the float element 3 and, simultaneously by pumping air out of the space 21 to control the downwards movement of the float element 3. The installed position is shown in FIG. 5c.

During lowering of the leg 4 and the foot 5, the float element is free to heave as indicated by the vertical double arrow in drawing 5a and 5b. The buoyancy means of the leg 4 are at least during a second part of the downwards movement of the leg 4 towards the installation position and in the installation position arranged below the wave zone such that little heave action is exerted on the leg 4.

FIG. 6 shows the embodiment of FIG. 1a in a second installation position, wherein the marine structure 1 keeps floating on the sea surface 50 after installation. FIG. 7 shows that the marine structure 1 for instance may be anchored via anchor cables 30 to anchor points 31 arranged at the bottom of the sea 60 to maintain the marine structure 1 at the installation location.

FIG. 1a shows the marine structure 1 floating on the sea before installation, i.e. in a pre-installation position. To install the marine structure 1, the marine structure 1 is sailed to the installation location, and the foot 5 of the leg 4 is lowered to a semi-submerged position, for instance by decreasing the buoyancy of the first buoyancy means 4a. In an alternative embodiment, the leg 4 may for instance be lowered by unlocking the leg 4 from a fixed position with respect to the float element 3. Any other suitable method or combination of methods may also be used.

In the installation position, the float element 6 is kept at sea level 50 to provide stability against tilting of the marine structure 1. Since the float element 3 is cylindrically symmetric the float element 3 may provide the same stability in all horizontal directions.

The sub-structure 2 and the float element 3 are freely movable with respect to each other in the substantially vertical direction. The first buoyancy of the sub-structure is sufficient to keep the sub-structure 2 afloat, and the second buoyancy of the float element 3 is sufficient to keep the float element 3 afloat.

The first buoyancy means of the leg 4 are arranged below a wave zone 51, so that there is little influence of heave action on the sub-structure 2. The advantage of the foot 5 of the leg 4 being brought into such semi-submerged position is that it is less influenced by heave of the sea. As a result, of this semi-submerged position, any utility element provided on the sub-structure 2 is relative stable in the sea and is not or less influenced by heave.

Any vertical movement of the float element 3 due to heave is not transferred to the sub-structure 2, since the float element 3 can freely move in this vertical direction with respect to the sub-structure 2.

FIGS. 8 and 9 show different applications of the marine structure of the invention. The different applications may be part of the marine structure or may be arranged on the marine structure after installation of the marine structure at an installation location.

FIG. 8 shows different applications of a marine structure arranged on the bottom of the sea. The marine structure may comprise all parts of the marine structure of FIG. 1a. From left to right the following applications are shown: an offshore platform, a work platform, a wind turbine, and a meteo mast.

FIG. 9 shows different applications of a marine structure floating on the sea. The marine structure may comprise all parts of the marine structure of FIG. 6. From left to right the following applications are shown: an offshore platform, a work platform, a wind turbine, and a meteo mast, or a wave energy converter. In the latter embodiment, the relative movement of the float element with respect to the leg caused by heave is used to generate usable energy, preferably storable energy, such as electrical energy.

It is remarked that the marine structure 1 of the invention may also be used for any other suitable application.

The invention claimed is:

1. A floating marine structure comprising:
   a sub-structure having only one leg having at least one first buoyancy chamber arranged in a lower part of the leg to provide a first buoyancy, wherein the first buoyancy is sufficient to keep the sub-structure afloat, and wherein the at least one first buoyancy chamber is ballastable to decrease buoyancy of the leg; and
   a float element having at least one second buoyancy chamber to provide a second buoyancy, wherein the second buoyancy is sufficient to keep the float element afloat, and wherein the at least one second buoyancy chamber is ballastable to decrease buoyancy of the float element,
   wherein the float element comprises a substantially vertically orientated passage extending through the float element and enclosing the leg in a substantially horizontal plane to form a linear guide to guide linear movement of the float element with respect to the sub-structure in the substantially vertical direction to allow relative wave induced motion with respect to each other in a substantially vertical direction,
   wherein the leg is movable from a pre-installation position to an installation position by a substantially downwards movement of the leg with respect to the float element,
   wherein during at least a second part of the downwards movement of the leg towards the installation position and/or in the installation position the at least one first buoyancy chamber is substantially located below a wave zone to substantially decrease heave action on the at least one first buoyancy chamber, and
   wherein during the at least a second part of the downwards movement of the leg, the weight of the complete sub-structure is carried by the leg.

2. The floating marine structure of claim 1, wherein the float element is a permanent part of the marine structure.

3. The floating marine structure of claim 1, wherein the float element is configured to be ballasted during installation and to become a ballast element of a base of the marine structure.

4. The floating marine structure of claim 1, wherein the leg comprises a foot to be arranged on the bottom of the sea.

5. The floating marine structure of claim 1, wherein the marine structure comprises brakes to provide a braking force between the sub-structure and the float element in order to control the relative movement of the leg and the float element.

6. The floating marine structure of claim 1, wherein the sub-structure comprises a platform movable with respect to the leg in the substantially vertical direction.

7. The floating marine structure of claim 1, wherein the marine structure comprises an offshore platform, a work platform, a turbine, a meteo mast, or a wave energy converter.

8. The floating marine structure of claim 1, wherein the marine structure comprises one or more closed spaces between the sub-structure and the float element, wherein the pressure in the one or more spaces may be used to move or control movement of the sub-structure and the float element with respect to each other.

9. A method to install a marine structure, comprising:
providing a marine structure comprising:
a sub-structure having only one leg having at least one first buoyancy chamber arranged in a lower part of the leg to provide a first buoyancy, wherein the first buoyancy is sufficient to keep the sub-structure afloat, and wherein the at least one first buoyancy chamber is ballastable to decrease buoyancy of the leg; and
a float element having at least one second buoyancy chamber to provide a second buoyancy, wherein the second buoyancy is sufficient to keep the float element afloat, and wherein the at least one second buoyancy chamber is ballastable to decrease buoyancy of the float element,
wherein the float element comprises a substantially vertically orientated passage extending through the float element and enclosing the leg in a substantially horizontal plane to form a linear guide to guide linear movement of the float element with respect to the sub-structure in the substantially vertical direction to allow relative wave induced motion with respect to each other in a substantially vertical direction,
sailing the marine structure to an installation location, and
moving the leg downwards with respect to the float element to an installation position of the leg, wherein during at least a second part of the downwards movement of the leg towards the installation position and/or in the installation position the at least one first buoyancy chamber is substantially located below a wave zone to substantially decrease heave action on the at least one first buoyancy chamber, and
wherein during the at least a second part of the downwards movement of the leg, the weight of the complete sub-structure is carried by the leg.

10. The method of claim 9, wherein the at least one first buoyancy chamber is ballastable to decrease buoyancy of the leg and wherein moving the leg downwards comprises ballasting the at least one first buoyancy chamber.

11. The method of claim 9, wherein the leg comprises a foot to be arranged on the bottom of the sea, and wherein the moving the leg to the installation position comprises arranging the foot of the leg on the bottom of the sea.

12. The method of claim 9, further comprising, after the foot of the leg is arranged on the bottom of the sea, the moving the float element downwards with respect to the leg to a float element installation position by ballasting of the float element.

13. The method of claim 12, wherein the float element during installation becomes a ballast element of a base of the marine structure.

14. The method of claim 13, wherein the float element, in its float element installation position, rests on the foot of the leg.

* * * * *